United States Patent
Riall

(10) Patent No.: US 10,025,114 B2
(45) Date of Patent: Jul. 17, 2018

(54) HYDROGEL LENS HAVING RAISED PORTIONS FOR IMPROVED OXYGEN TRANSMISSION AND TEAR FLOW

(71) Applicant: Johnson & Johnson Vision Care, Inc., Jacksonville, FL (US)

(72) Inventor: James Daniel Riall, St. Johns, FL (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 226 days.

(21) Appl. No.: 13/799,783

(22) Filed: Mar. 13, 2013

(65) Prior Publication Data

US 2014/0268019 A1    Sep. 18, 2014

(51) Int. Cl.
*G02C 7/04*    (2006.01)

(52) U.S. Cl.
CPC .............. *G02C 7/049* (2013.01); *G02C 7/047* (2013.01)

(58) Field of Classification Search
CPC ............................................ G02C 7/04–7/049
See application file for complete search history.

(56) References Cited

U.S. PATENT DOCUMENTS

| | | | |
|---|---|---|---|
| 3,468,602 A | 9/1969 | Rosen | |
| 4,640,592 A * | 2/1987 | Nishimura | G02B 6/001 345/60 |
| 4,640,594 A | 2/1987 | Berger | |
| 4,732,715 A | 3/1988 | Bawa | |
| 4,890,911 A | 1/1990 | Sule et al. | |
| 5,044,742 A | 9/1991 | Cohen | |
| 5,166,710 A | 11/1992 | Hofer | |
| 6,010,219 A | 1/2000 | Stoyan | |
| 6,570,386 B2 * | 5/2003 | Goldstein | G02C 7/04 324/415 |
| 2002/0021409 A1 * | 2/2002 | Marmo | 351/160 R |
| 2004/0044418 A1 * | 3/2004 | Goldstein | G03B 17/00 700/1 |
| 2006/0152673 A1 | 7/2006 | Cotie | |
| 2007/0135915 A1 | 6/2007 | Klima | |
| 2011/0149230 A1 * | 6/2011 | Menezes | G02C 7/048 351/159.02 |
| 2011/0228213 A1 * | 9/2011 | Legerton | B29D 11/00048 351/159.08 |
| 2011/0273663 A1 | 11/2011 | Pugh et al. | |
| 2012/0235277 A1 | 9/2012 | Pugh et al. | |

(Continued)

FOREIGN PATENT DOCUMENTS

| | | |
|---|---|---|
| CA | 1305342 C | 7/1992 |
| WO | WO 97/24639 A1 | 7/1997 |
| WO | WO 2011/116114 | 7/1997 |

(Continued)

OTHER PUBLICATIONS

Singapore Search Report for Application No. 10201400570U Date of Submission Jul. 16, 2014; Date of completion Oct. 29, 2014 Date received Jan. 26, 2015.

(Continued)

*Primary Examiner* — Robert E Tallman

(57) ABSTRACT

An ophthalmic device having improved oxygen transmissibility is provided. The ophthalmic device includes a hydrogel lens wherein the peripheral zone of the hydrogel lens includes a plurality of raised portions on the surface of the lens proximal to the ocular surface.

15 Claims, 4 Drawing Sheets

(56) References Cited

U.S. PATENT DOCUMENTS

2013/0102921 A1* 4/2013 Saurer et al. ............... 600/558

FOREIGN PATENT DOCUMENTS

| WO | WO 9724639 A1 | 7/1997 |
| WO | WO 2002010841 A1 | 2/2002 |
| WO | WO 2010051203 A1 | 5/2010 |
| WO | WO 2012/052765 A2 * | 4/2012 ............... 600/399 |

OTHER PUBLICATIONS

EP Search Report Application No. EP 14515 9580 dated May 23, 2014.
Singapore Written Opinion for Application No. 10201400570U dated Jul. 28, 2015.

* cited by examiner

HYDROGEL LENS HAVING RAISED PORTIONS FOR IMPROVED OXYGEN TRANSMISSION AND TEAR FLOW

TECHNICAL FIELD

The disclosure relates generally to an ophthalmic device configured to provide improved oxygen transmissibility, tear flow and comfort. More particularly, the ophthalmic device which is able to support a media insert.

BACKGROUND

It is very important in the field of ophthalmic devices and in particular in the field of contact lenses, that the lens is biocompatible and does not cause damage to the surrounding ocular tissue nor inhibit ocular fluid generation or flow during the time period of contact. In particular, it is critical that a sufficient amount of oxygen is able to reach the cornea while contact lenses are worn, otherwise eye health may become negatively impacted. For example, an inadequate supply of oxygen to the cornea can result in edema or swelling, hypoxia and can generally cause a great deal of discomfort and ultimately limit the period of time that the contact lens can be worn.

In general, during contact lens wear, oxygen can reach the cornea either by diffusion through the lens material or by freshly oxygenated tear fluid being generated by the eye under the lens during lens motion as the lens is worn. However, some contact lenses may include components or formulations that are made of materials that have low oxygen permeability, and therefore most of the oxygen reaching the cornea is limited to oxygen from tear mixing.

Consequently, hydrogel lenses are usually preferred over other contact lens materials because they are more comfortable and allow for more oxygen to reach the eye. When a hydrogel lens is worn, some oxygen reaches the cornea directly by diffusion through the lens. The amount of oxygen delivered to the cornea through the lens is dependent on the oxygen permeability of the lens. There is also some natural generation of oxygenated tears by the eye which occurs under the lens, which further oxygenates the eye.

More recently, however, ophthalmic devices have been theorized to be capable of added functionality for which they may require nonpermeable or less permeable components and compositions to be incorporated. The inclusion of nonpermeable or less permeable components and compositions which make oxygen transmission and tear flow more difficult and, as a result, increase the risk of damage to the cornea.

Therefore, there is a need for an ophthalmic device composed of a hydrogel lens that is designed to provide greater oxygen transmissibility and increased tear flow to reduce the risk of damage to the cornea.

SUMMARY

Accordingly, the foregoing needs are met, to a great extent, by one or more embodiments of the present invention. In accordance with some aspects of the disclosure, an ophthalmic device is provided. An ophthalmic device comprising a hydrogel lens wherein the topography of a portion of the peripheral zone of the hydrogel lens includes a plurality of raised portions on the concave surface of the lens proximal to the ocular surface of the eye.

Figure 1:
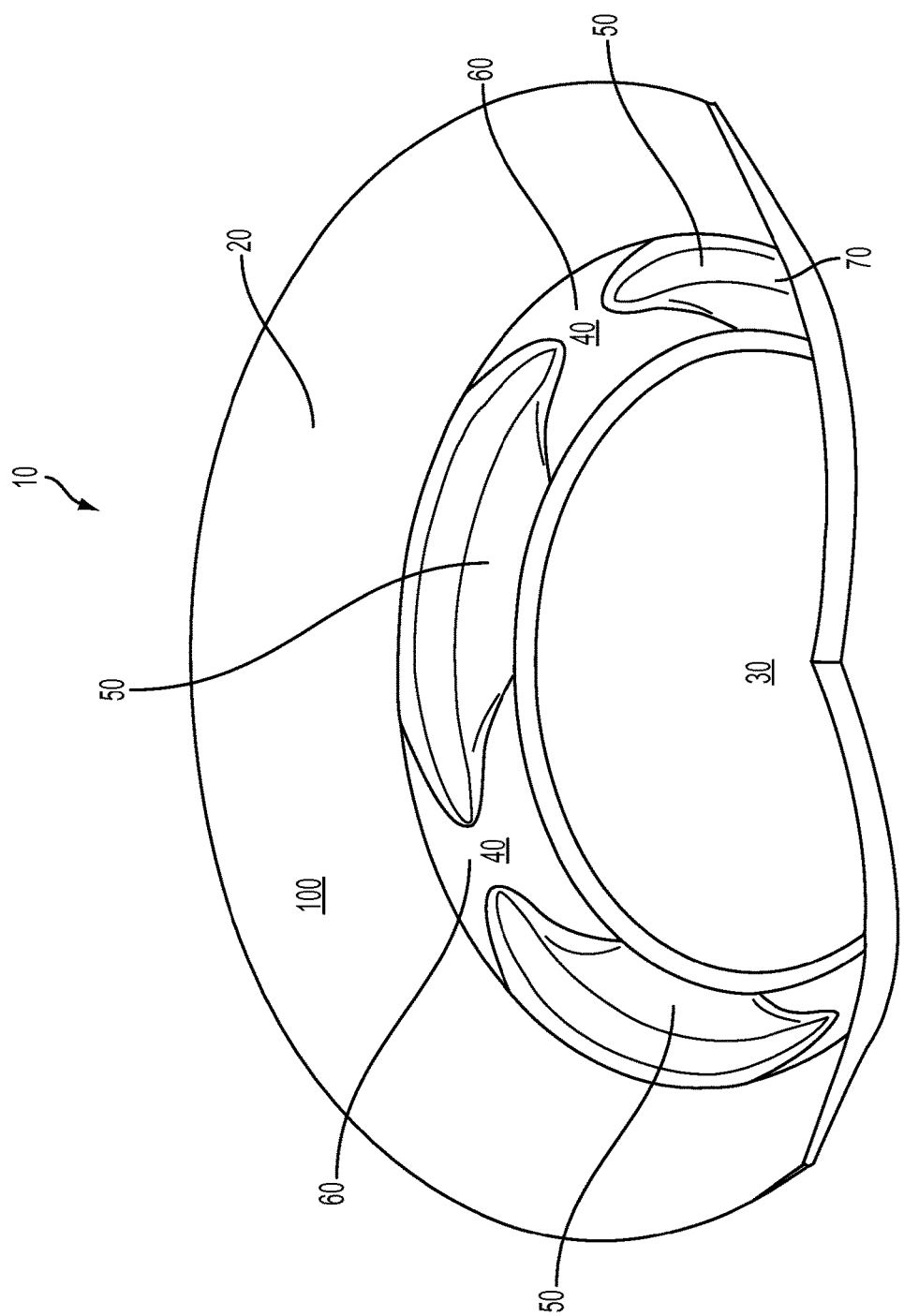
FIG. 1 illustrates a three-dimensional perspective view including a cross section of an ophthalmic device according to an exemplary embodiment of the present disclosure.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of aspects in addition to those described and of being practiced and carried out in various ways. Also, it is to be understood that the phraseology and terminology employed herein as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the invention. It is important, therefore that the claims be regarded as including such equivalent constructions insofar as they do not depart from the spirit and scope of the invention.

DETAILED DESCRIPTION

The present disclosure includes an ophthalmic device comprising a hydrogel lens wherein the topography of a portion of the peripheral zone of the hydrogel lens includes a plurality of raised portions on the concave surface of the lens proximal to the ocular surface of the eye. The raised portions which may help form a cavity between the ocular surface and the hydrogel lens wherein oxygen transmission and tear flow can occur in the cavity.

Glossary

In this description and claims directed to the presented invention, various terms may be used for which the following definitions will apply:

Active Lens Insert: as used herein, may refer to an electronic or electromechanical insert device with controls based upon logic circuits.

Functionalized Layer Insert: as used herein, may refer to an insert for an ophthalmic device formed from multiple functional layers from which at least a portion of them are stacked. The multiple layers may have unique functionality for each layer; or alternatively mixed functionality but in multiple layers. In some embodiments, the layers can be rings.

Ophthalmic Device: as used herein, may refer to any ophthalmic device that is capable of residing in or on the eye. These devices can provide one or more of: optical correction, therapy, and may be cosmetic. For example, the biomedical ophthalmic device can refer to an energized contact lens, intraocular lens, overlay lens, ocular insert, optical insert, punctal plug, or other similar ophthalmic device through which vision is corrected or modified, an eye condition can be enhanced or prevented, and/or through which eye physiology is cosmetically enhanced (e.g., iris color). In some embodiments, the ophthalmic device of the invention can include soft contact lenses made from silicone elastomers or hydrogels, which include but are not limited to silicone hydrogels, and fluorohydrogels.

Ocular Insert: as used herein, may refer to any active lens insert, media insert, or functionalized layer insert.

Lens: as used herein, may refer to any ophthalmic device that resides in or on the eye. These devices may provide optical correction or may be cosmetic. For example, the term lens may refer to a contact lens, intraocular lens, overlay lens, ocular insert, optical insert or other similar device through which vision is corrected or modified, or through which eye physiology is cosmetically enhanced (e.g. iris color) without impeding vision. In some embodiments, the preferred lenses of the invention are soft contact lenses are made from silicone elastomers or hydrogels, which include but are not limited to silicone hydrogels, and fluorohydrogels.

Lens Design: as used herein, may refer to form, function and/or appearance of a desired Lens, which if fabricated, may provide functional characteristics comprising but not limited to optical power correction, color appearance, therapeutic functionality, wearability, acceptable permeability, shape, composition, conformability, acceptable Lens fit (e.g., corneal coverage and movement), and acceptable Lens rotation stability.

Lens Components: as used herein, can include but are not limited to pigments, electrical components, UV blockers, tints, photoinitiators, catalysts, optical components, and/or active agents suitable to provide for specific functionality of an Ophthalmic Lens. Functionality may include, for example, one or more of: optical correction, enhanced vision, cosmetic effects, and therapeutic functionality.

Media Insert: as used herein, may refer to a formable or rigid substrate capable of supporting an Energy Source within an ophthalmic lens. In some embodiments, the Media Insert also includes one or more variable optic lenses.

Mold: as used herein, may refer to a rigid or semi-rigid object that may be used to form lenses from uncured formulations. Some molds can include one or two mold parts used to form a hydrogel lens comprising raised portions.

Ocular Surface: as used herein, may refer to the anterior surface area of the eye.

Optical Zone: as used herein, may refer to an area of an ophthalmic device or lens through which a wearer of the ophthalmic lens sees after the lens is formed.

Peripheral Zone: As used herein, the term "peripheral zone" or "non-optic zone" may refer to an area of an ophthalmic lens outside of the optic zone of the ophthalmic lens, and therefore outside of a portion of the ophthalmic lens through which a lens wearer sees while wearing the ophthalmic lens on, near or in the eye in a normally prescribed fashion.

Stacked: as used herein, can refer to the placement of at least two component surfaces in proximity to each other such that at least a portion of surface of one of a first component contacts at least a portion of a surface of a second component. In some embodiments, a film, whether for adhesion or other functions may reside between the two surfaces that are in proximity with each other. In some embodiments, the stacking of components may result in an encapsulated first component. The components can be an Ocular Insert and a hydrogel Lens together forming an Ophthalmic Device.

Referring now to FIG. 1, a three-dimensional perspective view of an ophthalmic device 10 according to the present disclosure is provided. In particular, FIG. 1 shows an Ophthalmic Device that includes exemplary raised portions on the concave surface of the Lens proximal to the Ocular Surface. The Ophthalmic Device 10 includes a hydrogel Lens 20. The hydrogel Lens 20 includes an Optic Zone 30 and a Peripheral Zone 40. The hydrogel lens 20 may be composed of a silicon hydrogel or any biocompatible hydrogel material that is known to be used in ophthalmic lenses. In some embodiments, for example, the ophthalmic lens type includes a silicone containing component A "silicone-containing component" can be one that contains at least one [—Si—O—] unit in a monomer, macromer or pre polymer. Preferably, the total Si and attached 0 are present in the silicone-containing component in an amount greater than about 20 weight percent, and more preferably greater than 30 weight percent of the total molecular weight of the silicone-containing component. Useful silicone-containing components preferably comprise polymerizable functional groups such as acrylate, methacrylate, acrylamide, methacrylamide, vinyl, N-vinyl lactam, N-vinylamide, and styryl functional groups.

Figure 3:
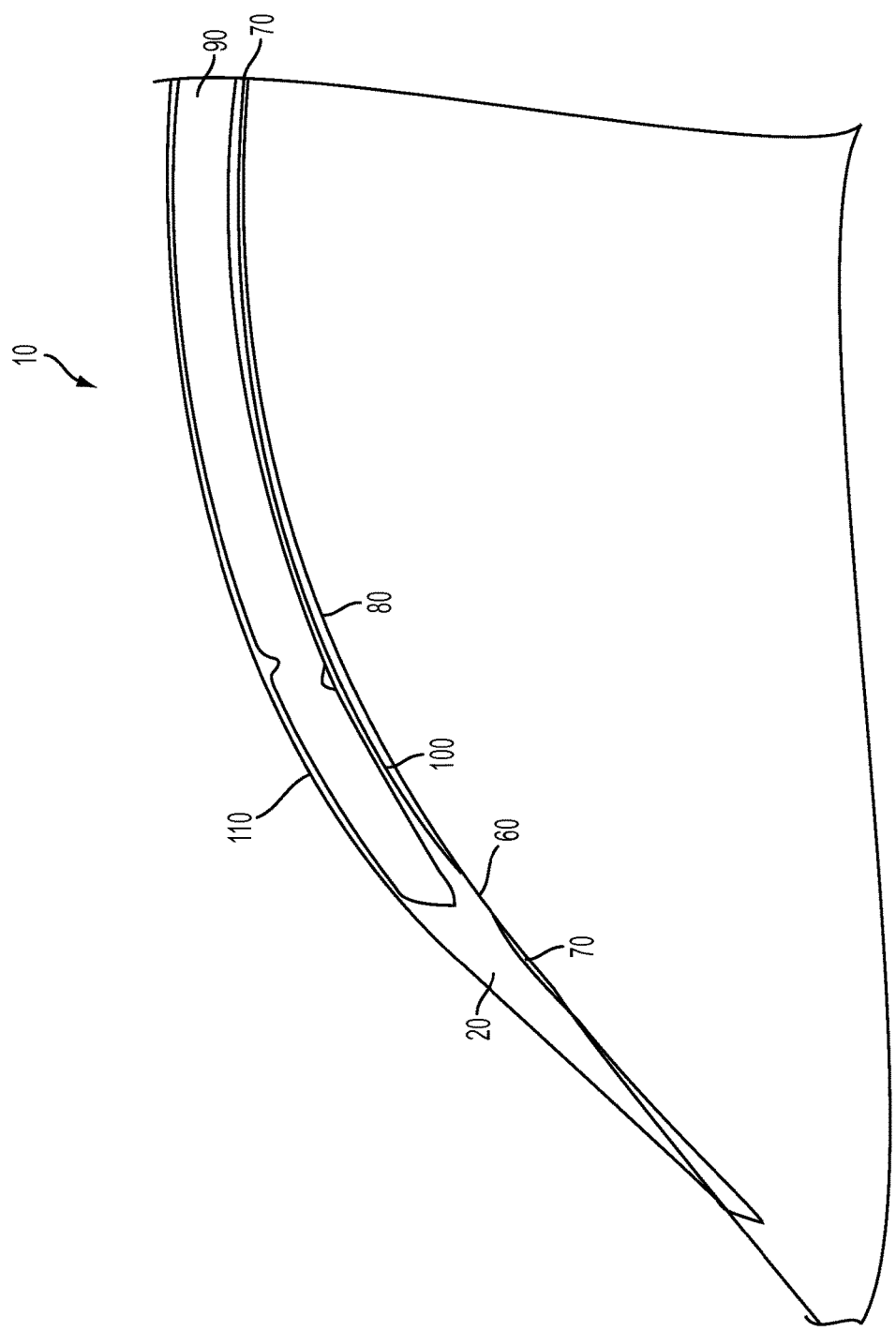
FIG. 3 illustrates a partial cross-sectional view of an exemplary ophthalmic device according to an embodiment of the present disclosure.
Figure 4:
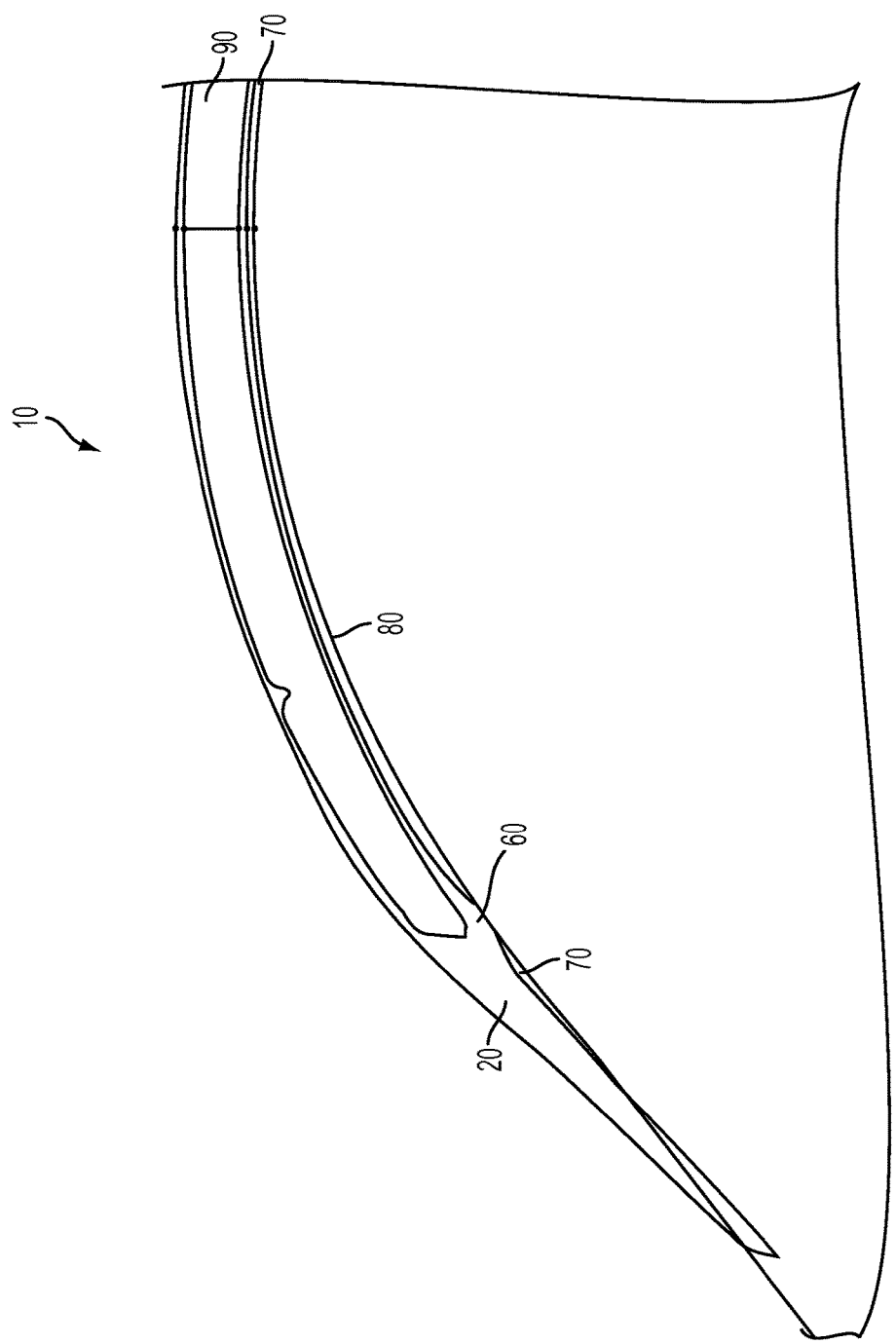
FIG. 4 illustrates a partial cross-sectional view of another exemplary ophthalmic device according to an embodiment of the present disclosure showing a hydrogel lens with a media insert.

The peripheral zone 40 of the hydrogel lens 20 can include a plurality of raised portions 50 on the concave surface of the lens 20 proximal to the ocular surface 100. The ocular surface is shown in FIGS. 3 and 4 as 80. The surface of the hydrogel lens 20 that is proximal to the ocular surface 100 is also shown in FIGS. 3 and 4. The raised portions 50 are spaced apart or positioned along the peripheral zone 40 and are not present in the optic zone 30. This is to ensure that the raised portions 50 do not interfere with the user's vision.

The raised portions 50 are spaced part along the peripheral zone 40 to create gap portions 60 between adjacent raised portions 50. FIG. 1 illustrates two distinct gap portions 60. The gap portions 60 allow for oxygen transmission because the ocular surface 80 is exposed in the gap portions 60 and oxygen can reach the ocular surface 80 without permeating through the raised portions 50. Tear flow may also occur in the gap portions 60, thereby further increasing the amount of oxygen provided to the ocular surface 80.

Any number of raised portions 50 may be included in the peripheral zone 40. The number and the size of the raised portions will determine the size and number of gap portions 60, which can increase or decrease oxygen transmission and tear flow. In one embodiment according to the present disclosure, there can be four raised portions and the gap portions can be 1 mm wide.

In some embodiments according to the present disclosure, the raised portions 50 may be arranged to wrap around the peripheral zone 40 in a sinusoidal curve pattern. The amplitude of the sinusoidal curve may be on the order of 3 microns to 80 microns. The frequency of the peaks of the sinusoidal curve may be as few as 2 to as many as 50. Other arrangements for the raised portions 50, however, are possible and are not limited to sinusoidal curves or regular periodic geometry.

The raised portions 50 generally should be large enough such that the natural softness of the ocular surface 80 does not conform to the shape of the raised portions 50 and block them as effective fluid channels. On the other hand, the raised portions 50 should not be so large that they cause high contact stress in the ocular surface 40 and cause discomfort or damage to the wearer.

The raised portions 50 may be composed of any biocompatible material previously described and/or that is known to be used in ophthalmic lenses. For example, in some embodiments according aspects of the present disclosure, the raised portions 50 may be composed of hydrogel or silicon hydrogel. Accordingly, the raised portions 50 may be composed of the same hydrogel as used to form the hydrogel lens 20. In yet other embodiments, the raised portions 50 may be composed of materials that are different and in particular, provide a more rigid material than the hydrogel lens 20. A more rigid material for the raised portions 50 can be useful to help support the hydrogel lens 20 above the ocular surface 80.

In some embodiments, the hydrogel lens 20 and raised portions 50 may be formed by cast molding. A mold may be used to form the hydrogel lens 20 and raised portions 50 lenses from uncured formulations. Some molds may include two mold parts forming a hydrogel lens 20 and raised portions 50. It is possible to achieve different properties for the raised portions 50 than the hydrogel lens 20 by selectively polymerizing the raised portions 50 for a longer period of time or by using a different monomer. This may result in the raised portions 50 being more i.e., rigidity, stiffness, strength.

Figure 2:
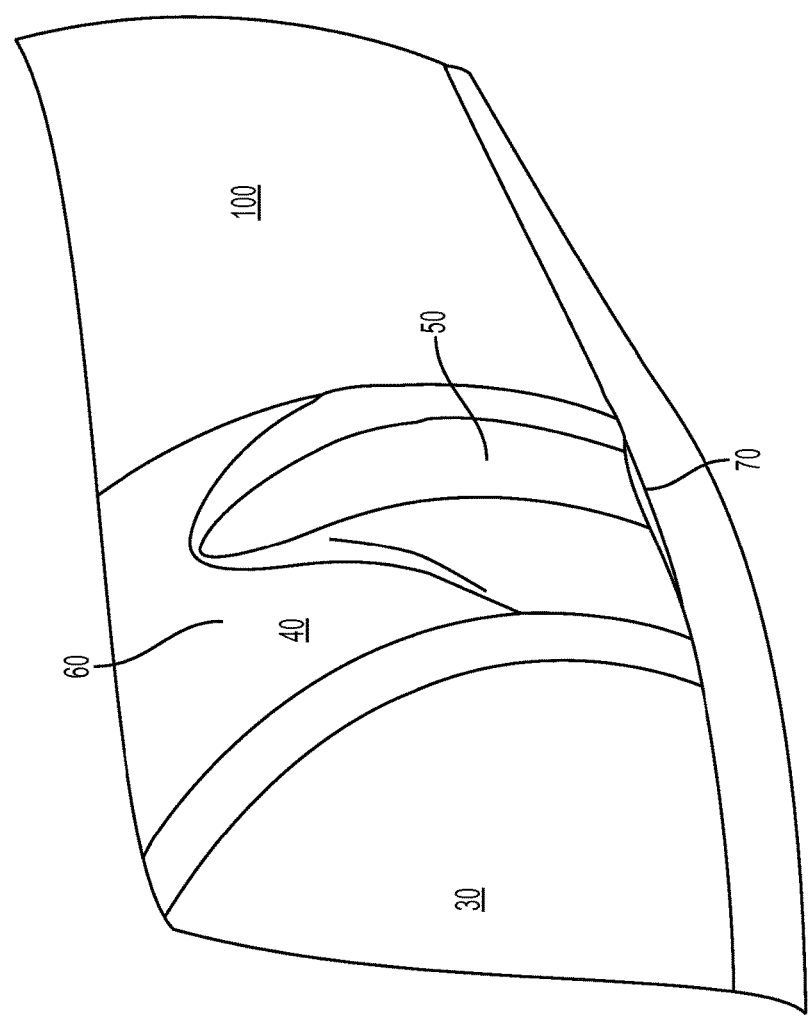
FIG. 2 illustrates a partial enlarged perspective view and cross section of the raised portion of a hydrogel lens according to an embodiment of the present disclosure.

Referring now to FIG. 2, an enlarged perspective view of the raised portion 50 of a hydrogel lens 20 according to an embodiment of the present disclosure is shown. As shown in FIG. 2, the raised portion 50 transitions smoothly along the peripheral zone 40 of the hydrogel lens 20 in both radial and tangential directions. The size and shape of the raised portion 50 can be designed to accommodate the size and shape of the hydrogel lens 20.

The raised portions 50 of the hydrogel lens 20 can create a cavity 70 between the hydrogel lens 20 and the ocular surface 80 of the eye. The cavity 70 formed by the raised portions 50 is shown in FIGS. 1 and 2. In some embodiments according to the present disclosure, the cavity 70 formed has a thickness that is at least 10% of the thickness of the hydrogel lens 20. For example, in some embodiments, the cavity 70 is 0.085 mm high above the ocular surface 80.

Because the raised portions 50 can be located on the surface of the lens 20 proximal to the ocular surface 100, the raised portions 50, not the hydrogel lens 20, are in contact with the ocular surface 80. Therefore, the raised portions 50 prevent the hydrogel lens 20 from adhering to the ocular surface 80 and allow for oxygen transmission and tear flow inside the cavity 70.

The size and geometry of the cavity 70 formed is determined by the number of raised portions 50 and the total surface area of the raised portions 50 on the ocular surface 80 relative to the surface area of the hydrogel lens proximal to the ocular surface 100. In other words, the greater the area of the ocular surface 80 that remains exposed, the greater the oxygen transmission and tear flow can occur through the cavity 73. If the raised portions 50 are sized too large or if there are too many, it may limit the availability of oxygen transmission and tear flow through the ocular surface 80. Therefore, the size and number of the raised portions 50 should be selected to maximize the amount of ocular surface for oxygen transmission and tear flow to promote eye health. In some embodiments according to the present disclosure, the raised portions 50 have a total surface area that is less than 50% of the surface area of the ocular surface 80.

The ophthalmic device 10 according to the present disclosure may further include a complementary Ocular Insert lens (not shown). The ocular insert lens may be disposed on the surface of the hydrogel lens distal to the ocular surface 110. The surface of the hydrogel lens distal to the ocular surface 110 is opposite the surface of the hydrogel lens 20 that has the raised portions 50. In one embodiment according to the present disclosure, the ocular insert lens is a rigid gas permeable lens.

Due to the lens design of the ophthalmic device 10 having a hydrogel lens 20 with raised portions 50, an ocular insert lens may be used without adversely affecting oxygen transmission and tear flow in the eye. Because the raised portions 50 form a cavity 70 in which the oxygen transmission and tear flow can occur, using a pigging back lens with the hydrogel lens 20 will allow the wearer to benefit from layering lenses or using an ocular insert lens without risking any damage to the ocular surface 80 or the cornea. One advantage of using an ocular insert lens may include allowing the wearer to enjoy the benefits of a rigid gas permeable contact lens even when the wearer cannot tolerate the rigid gas permeable contact lens due to the fit, or sensitivity as a result of trauma or surgery.

In some embodiments according to the present disclosure, the raised portions 50 may be arranged along the circumference of an ocular insert lens, such that the raised portions 50 extend radially inward and outward enough to smoothly blend into the surface of the hydrogel lens 20 and minimize contact stress with the eye. Because the ocular insert lens may be rigid, the ocular insert lens forms a nearly unbreakable seal with the ocular surface 80. The raised portions 50, in this instance, are formed along the perimeter of the ocular insert lens. This is especially the case if the ocular insert lens has a steeper or more curved spherical curvature than the ocular spherical curvature, which creates a cupped or vaulted fit.

The cupped or vaulted fit has several benefits such as there is no contact with the center of the eye, there is more tear fluid volume and there are a wider range of lens sizes that fit. Therefore, arranging raised portions 50 along the circumference of the ocular insert lens allows the wearer to benefit from using an ocular insert lens that has a vaulted or cupped fit on the eye without creating an undesirable or uncomfortable edge seal from the ocular insert lens around the ocular surface 80. The raised portions 50 may be arranged along the circumference of the ocular insert lens in a sinusoidal curve pattern as previously described.

Additionally, electronic components have recently been incorporated into contact lenses. For example, these electronic components can include semiconductor devices. Some examples have shown semiconductor devices embedded in a contact lens placed upon animal eyes. It has also been described how the components may be energized and activated in numerous manners within the lens structure itself.

However, physical constraints including the size and shape of these components have presented difficulties in using them in certain ophthalmic lenses. Furthermore, incorporating these components into hydrogel lenses 20 would interfere with the oxygen transmissibility and depending on the placement of the component within the hydrogel lens 20 would make it difficult to remove the lens 20. Technological embodiments that address such an opthalmological background need generate solutions that not only address ophthalmic requirements but also encompass novel embodiments for the more general technology space of powered electrical devices.

The lens design disclosed herein would allow for incorporating components such as active lens inserts, media inserts, and functionalized layer inserts into the hydrogel lens 20. Additionally, these components may be stacked. These components may be supported by the hydrogel lens 20 or alternatively, encapsulated by the hydrogel lens 20. FIG. 3 and FIG. 4 illustrate an example of an ophthalmic device 10 having a media insert 90 encapsulated by the hydrogel lens 20. The raised portions 50 cannot be seen in the cross-sectional view of the ophthalmic device 10 in FIGS. 3 and 4. The cavities 70 formed by the raised portions 50 is shown in FIGS. 3 and 4. As can be seen from FIGS. 3 and 4, the shape of the cavities 70 formed can be different.

Additional features, advantages, and aspects of the disclosure may be set forth or apparent from consideration of the following detailed description, drawings, and claims. Moreover, it is to be understood that both the foregoing summary of the disclosure and the following detailed description are exemplary and intended to provide further explanation without limiting the scope of the disclosure as claimed.

What is claimed is:

1. An ophthalmic device comprising:
   a hydrogel lens including at least three concentric zones comprising an optic zone, an outer zone, and a peripheral zone located between the optic zone and the outer zone; and
   an ocular insert in the optic zone;
   wherein the peripheral zone of the hydrogel lens includes a plurality of elongated raised portions on the surface of the hydrogel lens proximal to an ocular surface of a wearer's eye that are separated by gap portions between adjacent elongated raised portions such that none of the elongated raised portions fully encircle the optic zone;
   wherein the optic zone and the outer zone of the hydrogel lens do not include raised portions, and
   wherein the elongated raised portions comprise a more rigid material than the remaining portions of the hydrogel lens.

2. The ophthalmic device of claim 1 wherein the gap portions allow for oxygen transmission and tear flow.

3. The ophthalmic device of claim 1 wherein the raised portions prevent unwanted adhesion of the ophthalmic device to the ocular surface.

4. The ophthalmic device of claim 1 wherein the raised portions are configured to create a cavity between the ocular surface and the hydrogel lens.

5. The ophthalmic device of claim 4 wherein oxygen transmission and tear flow occurs in the cavity.

6. The ophthalmic device of claim 4 wherein the cavity has thickness that is at least 10% of the thickness of the hydrogel lens.

7. The ophthalmic device of claim 1 wherein the raised portions are arranged along the circumference of the ocular insert.

8. The ophthalmic device of claim 1 wherein the hydrogel lens supports the ocular insert.

9. The ophthalmic device of claim 1 wherein the hydrogel lens encapsulates the ocular insert.

10. The ophthalmic device of claim 1 wherein the elongated raised portions comprise hydrogel material that is different from the hydrogel material of the remaining portions of the hydrogel lens.

11. The ophthalmic device of claim 1 wherein the raised portions comprise silicon hydrogel.

12. The ophthalmic device of claim 1 wherein the hydrogel lens comprises a silicon hydrogel.

13. The ophthalmic device of claim 1 wherein the hydrogel lens and raised portions are formed by cast molding.

14. The ophthalmic device of claim 1 wherein the raised portions have a total surface area less than 50% of the surface area of the ocular surface.

15. The ophthalmic device of claim 1, wherein each of the raised portions has substantially the same height.

* * * * *